Oct. 19, 1965 R. K. DAUGHERTY 3,212,621
APPARATUS FOR ORIENTING, SPACING AND FEEDING
ARTICLES OF IRREGULAR SHAPE
Filed July 10, 1961 4 Sheets-Sheet 4
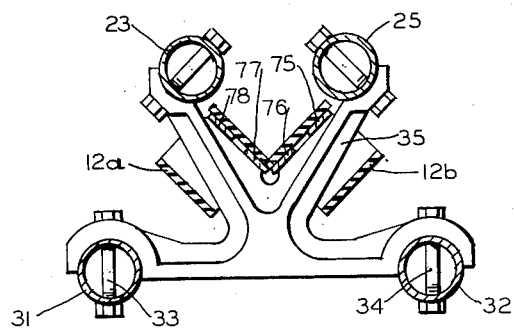
FIG_5
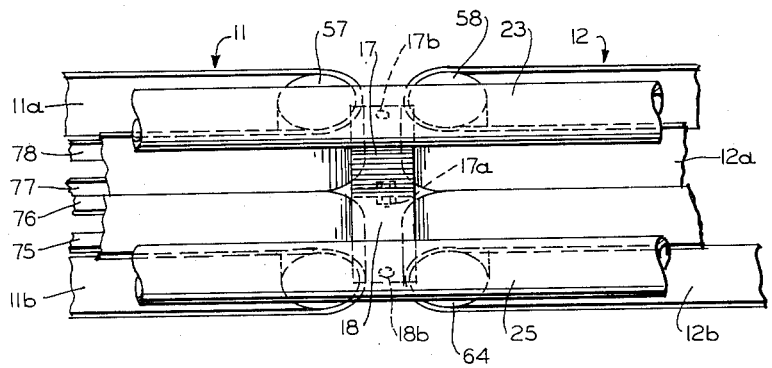
FIG_6
INVENTOR.
RALPH K. DAUGHERTY
BY
ATTORNEYS

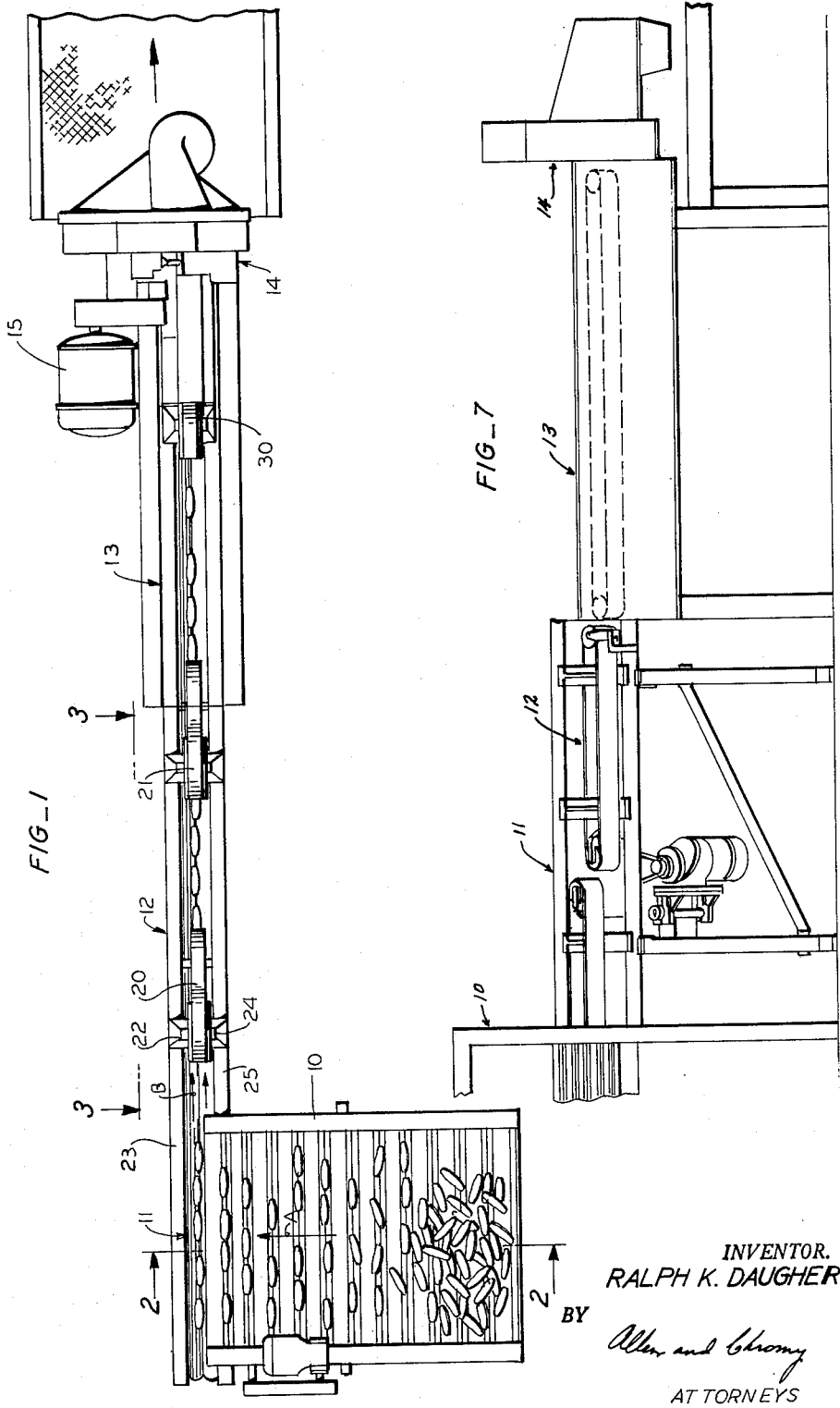

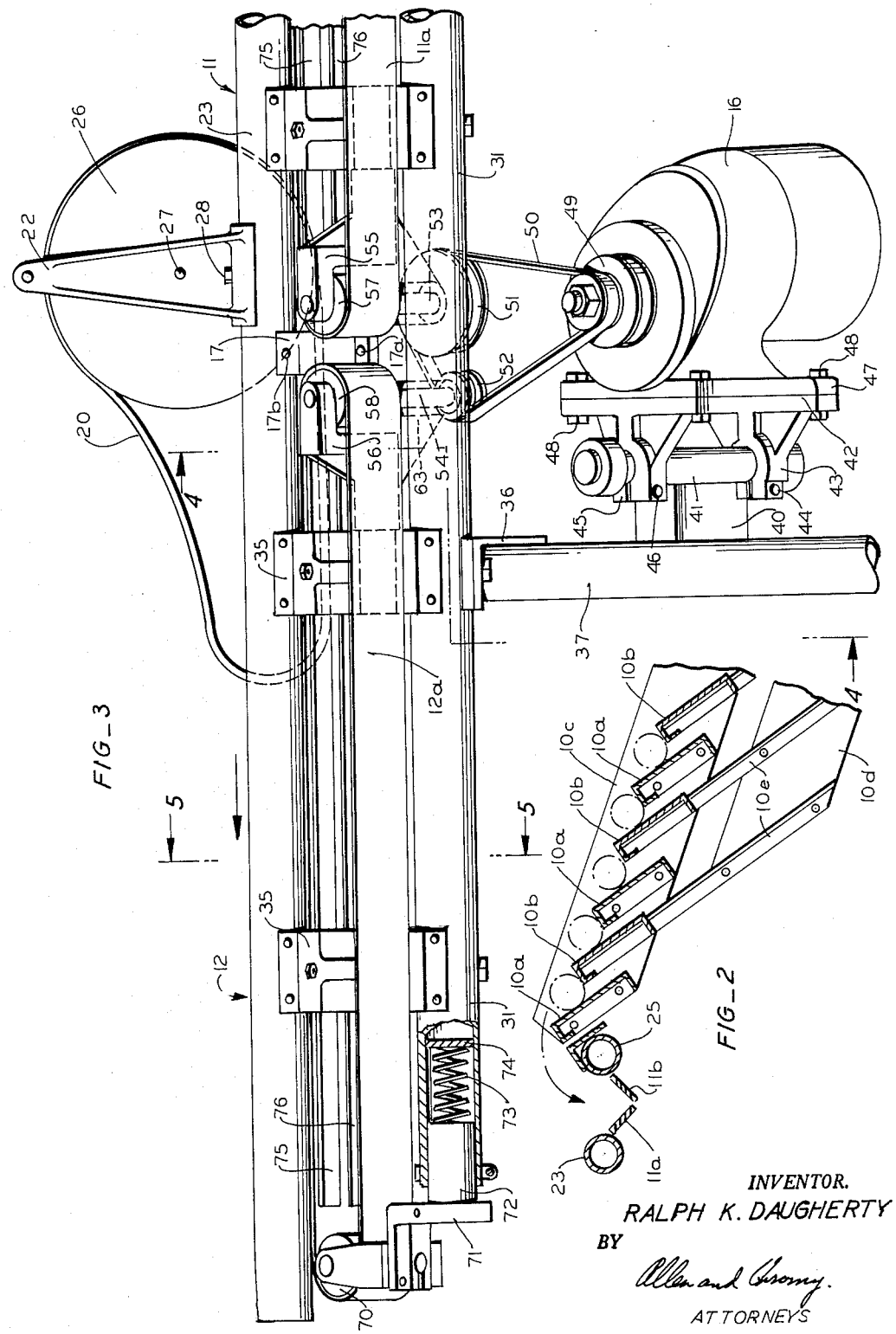

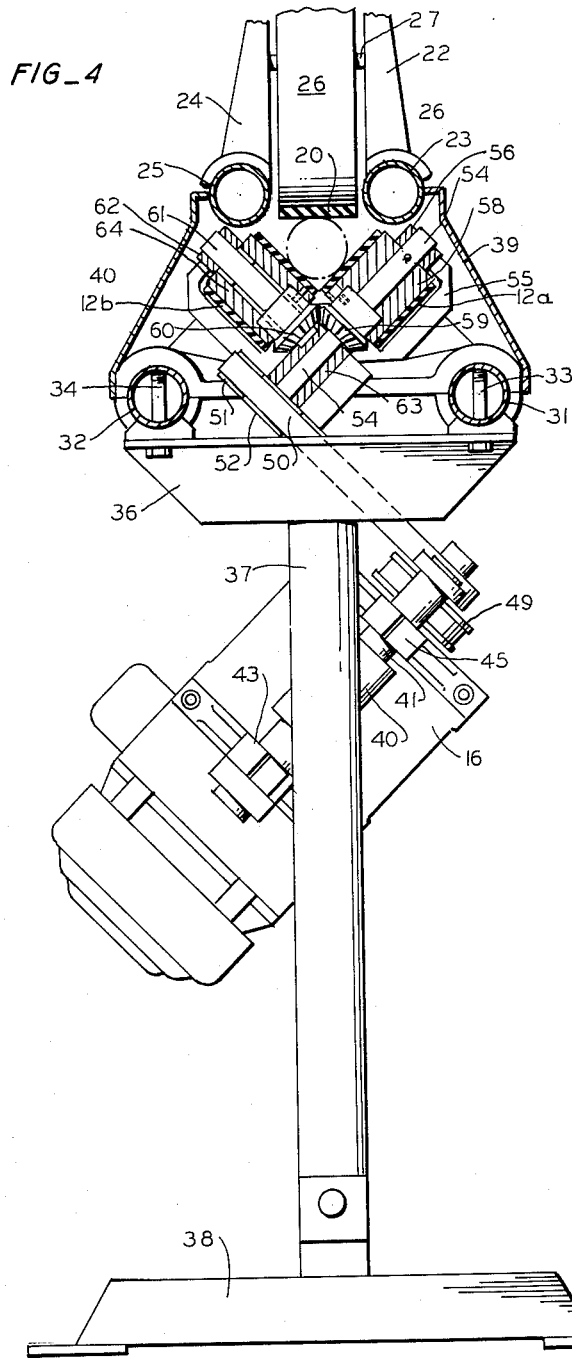

3,212,621
APPARATUS FOR ORIENTING, SPACING AND FEEDING ARTICLES OF IRREGULAR SHAPE
Ralph K. Daugherty, San Jose, Calif., assignor, by mesne assignments, one-half to Genevieve I. Magnuson, and one-half to Genevieve I. Magnuson, Robert Magnuson, and Lois J. Fox, trustees of the estate of Roy M. Magnuson
Filed July 10, 1961, Ser. No. 122,970
1 Claim. (Cl. 198—30)

This application is a continuation in part of my application Serial No. 794,303, filed February 19, 1959, now abandoned, for Feeding of Elongated Articles in Oriented Position.

This invention relates to orienting and feeding of articles of irregular shape such as pickles and the like. More particularly, this invention relates to an apparatus and method for receiving a bulk feed of irregular articles arranging the articles in oriented lines, spacing the articles in such lines and feeding these articles to processing apparatus.

An object of this invention is to provide an improved orienting, spacing and feeding apparatus for articles of irregular shape.

Another object of this invention is to provide an improved apparatus for segregating irregular articles from a bulk feed in oriented position in linear array, spacing the articles in the linear array and thereafter feeding the articles to a processing apparatus.

Still another object of this invention is to provide an improved orienting, spacing and feeding apparatus for articles of irregular shape, said apparatus employing conveyors driven by a common motor at different speeds.

Other and further objects of this invention will be apparent from the following specification, claims and drawing to those skilled in the art to which the invention relates.

In accordance with this invention, there is provided a method and apparatus for orienting, spacing and feeding irregular articles to a processing apparatus. In this apparatus irregular articles are bulk fed to one end of the apparatus and supplied one by one from the other end thereof to a machine or device for further processing or packaging of the articles. Thus the input part of this apparatus may comprise a shuffle feed of the type disclosed in Patent No. 2,792,929 which functions to arrange the irregular articles in linear arrays. These linear arrays are fed one line at a time to the input of a conveyor system which comprises a series of trough type conveyors which travel at progressively increased speeds so that the spacing of the articles supplied to the input of the conveyor system from the shuffle feed is increased as they progress down the conveyor system until they are supplied one by one to the processing or packaging apparatus at the end of the conveyor system.

The shuffle feeder and conveyor series are operated in timed relation with the processing apparatus at the output end of the conveyor series and the irregular articles are fed to the processing apparatus at certain intervals.

Referring to the drawing briefly:

FIG. 1 is a plan view of an embodiment of this apparatus;

FIG. 2 is a sectional view taken along the line 2—2 of FIG. 1;

FIG. 3 is a view taken along the line 3—3 of FIG. 1;

FIG. 4 is a sectional view taken along the line 4—4 of FIG. 3;

FIG. 5 is a sectional view taken along the line 5—5 of FIG. 3;

FIG. 6 is a detail view of the input and output ends of a pair of adjoining conveyors; and FIG. 7 is a side view of a modified conveyor arrangement.

The shuffle mechanism 10 may be of the type disclosed in Patent No. 2,792,929 patented on May 21, 1957 and is provided with transverse shuffle feed members arranged in two interleaved series as shown in FIG. 2. The articles are arranged in rows by this shuffle feed mechanism and supplied to the conveyor 11 which is located at the output of the shuffle feed. The output end of the conveyor 11 supplies the input of conveyor 12 and the output of conveyor 12 supplies the input of conveyor 13. The output of conveyor 13 feeds the articles to the processing apparatus 14 which in the case of cucumbers or pickles may be a conventional slicing machine. Each of these conveyors comprises a pair of belts which are arranged with a V therebetween and the angle between each pair of belts does not exceed 90 degrees so that the articles fed to the conveyors are gripped thereby on opposite sides thereof.

These conveyors are operated at different speeds for example, in the case of a shuffle feed mechanism which is 2½ feet wide and supplies the oriented articles to conveyor 11, if this shuffle feed is operated at 125 strokes per minute, then conveyor 11 must be operated at about 315 feet per minute so as to carry away the linear arrays of articles as these are supplied to it from the output of the shuffle feed mechanism 10 and prevent piling up of these articles on this conveyor. Conveyor 12 would then be operated at about 420 feet per minute so as to receive the articles from the output of conveyor 11 and provide additional spacing between adjacent articles. In order to provide still further spacing to these articles, conveyor 13 is operated at still greater speed of, for example, about 660 feet per min. At these relatively high speeds, articles such as pickles and cucumbers which have relatively smooth and slick surfaces have a tendency to slip on the conveyors particularly when they are fed to conveyor 11 and when they are transferred from one conveyor to another, unless special precaution is made for gripping such articles. For this purpose the conveyors are arranged with the angle of the V therebetween such that the articles are gripped by the conveyor belts on opposite sides.

Thus the articles arranged in rows by the shuffle feed mechanism 10 are moved row by row along this shuffle feed in the direction indicated by the arrow A shown in FIG. 1, and these rows are discharged from the output end of the shuffle feed on to the conveyor 11 which is moving in a direction at right angles to the movement of the articles in the shuffle feed as indicated by the pair of arrows B positioned on conveyor 11. It is, therefore, seen that the articles discharged by the shuffle feed 10 must be gripped by the conveyor 11 which is traveling at a relatively high speed, for example about 315 feet per minute, so that these articles are accelerated to this speed immediately when they land on the conveyor.

The shuffle feed mechanism 10 is provided with a plurality of members 10a and 10b that are adapted to oscillate up and down and these members are arranged in two groups which are interleaved so that one group of members may be moved up while the other is moved down or vice versa through relatively short distances. The members 10a which form one group have the ends thereof attached to rails or side members such as the side member 10c shown in FIG. 2 and the members 10b which form the other group are attached to the top portions of members 10e and the bottom end portions of these members are attached to rails or side members such as the side member 10d shown in FIG. 2.

The conveyors 11, 12 and 13 are preferably positioned at the same level and suitable plate or plates 17 and 18 are provided between these conveyors, as shown in FIG. 1. Since the conveyor 12 is operated at a substantially greater speed than the conveyor 11, the pickles, cucumbers or other articles fed off of the conveyor 11 to conveyor 12 are passed under the idler belt 20 as they are fed off of conveyor 11 onto conveyor 12 to keep them from bouncing around on conveyor 12 caused by shifting from the slower conveyor 11 to the faster conveyor 12. The idler belt 20 is made wide enough so that the side edges on the lower portion thereof engage the conveyor 12 when no articles are interposed therebetween. Thus this idler belt is accelerated to the speed of conveyor 12. The articles fed from conveyor 11 to conveyor 12 are passed under idler belt 20 which engages these articles on their top sides. These articles ride on the belts of conveyor 12 which engage them on opposite bottom sides since these belts are arranged in a trough-like fashion and a V-shaped trough is formed therebetween.

A similar idler belt 21 is positioned over the output end of conveyor 12 and input end of conveyor 13. This idler belt 21 is similar to idler belt 20 and is also made wide enough so that the side edges on the bottom thereof engage the belts forming the conveyor 13 which are operating at a speed substantially greater than the belts of conveyor 12. Thus idler belt 21 is caused to move at a speed corresponding to the speed of conveyor 13, and articles fed from conveyor 12 to conveyor 13 pass under the moving idler belt 21 which engages these articles on the top sides thereof, while the bottom sides of these articles are engaged by the belts of conveyor 13. These conveyor belts are also arranged in trough-like fashion so that they form the opposite sides of a V-shaped trough similar to those formed by the belts of conveyors 11 and 12.

The gaps between the belt conveyors 11–12 and 12–13 are bridged by plate members, such as 17 and 18 shown in FIG. 6. These members are provided with upper portions that are curved to conform to the curved contour of the undersides of pipes 32 and 25 and these curved portions are attached to these pipes by suitable bolts 17b and 18b respectively. The bottom parts of members 17 and 18 are held together by bolt 17a.

Idler belt 20 is positioned on a wheel 26 which is mounted on an axle 27, as shown in FIG. 3. Axle 27 is supported by a pair of opposed upright members 22 and 24 as shown in FIG. 4, which are attached by means of suitable bolts such as the bolt 28, shown in FIG. 3 to the tubular members 23 and 25 respectively. These tubular members extend down the length of the conveyors and overlie the top edge portions of the belts forming these conveyors so that, if any of the articles moving along on these conveyor belts bounce around thereon, these tubular members act as guards to prevent such articles from bouncing off of the conveyors. Idler belts 20, 21 and 30 are all of similar construction and wheels similar to the wheel 26 shown in FIG. 3 are provided for supporting each of these idler belts. Similar mounts are also provided for each of these wheels.

The frame of this machine is provided with a pair of tubular members 31 and 32 which are attached to the upper cross pieces of the supporting stands, such as the supporting stand comprising the upper cross piece 36 which is attached to the leg 37, as shown in FIG. 4. Suitable bolts 33 and 34 are employed for attaching the tubular members 31 and 32 respectively to these cross pieces. Several such stands are provided to this apparatus for supporting the frame work thereof at the desired operating level, and the bottom ends of the legs thereof are attached to suitable feet or pads such as the pad 38 shown in FIG. 4. The top tubular members 33 and 35 are attached to the lower tubular members 31 and 32 respectively, at a plurality of spaced points by means of brackets such as the brackets 35 shown in FIGS. 3 and 5. Thus these top tubular members also lend strength to the framework of this machine. Suitable side plates 39 and 40 may also be provided to this apparatus and these plates may be attached to the lower tubular members 31 and 32 respectively to provide side enclosures for the conveyors. These side plates 39 and 40 are shown in the sectional view FIG. 4, but not in the side view FIG. 3, in as much as in the latter view the conveyor belts would be obscured thereby.

The belts of conveyors 11 and 12 are driven by a single motor 16 which is supported on the leg 37. This motor mount includes a member 40 which is attached to the leg 37 by welding or the like and to which the shaft 41 is attached, also by welding or the like. The plate 42 is bolted to the bottom of the motor 16 by means of the bolts 48. This plate is provided with a pair of members 43 and 45 each of which is provided with a split collar, and these collars are adapted to receive a shaft 41a and be clamped to this shaft by means of suitable bolts 44 and 46 respectively, so that the position of the motor-supporting plate 42 may be adjusted on the shaft 41a. Thus either the small pulley or the large pulley of the pulley assembly 49 may be aligned with the pulleys 51 and 52. Also the position of the motor 16 may be adjusted with respect to the pulleys 51 and 52 so that the belt 50 may be placed either on the small or the large pulley of the pulley assembly 49, whereby the conveyor arrangement in each case may be driven at either one of two speeds.

The pulleys 51 and 52 are fixedly attached to the lower ends of the shafts 53 and 54 respectively, which are journaled in the brackets 55 and 56 respectively, and these brackets are attached to the pipe 31. Pulleys 57 and 58 are attached to shafts 53 and 54 respectively for driving the belts 11a and 12a respectively of conveyors 11 and 12, as shown in FIG. 3.

A beveled gear 59, shown in FIG. 4, is fixedly attached to the shaft 54 and this gear meshes with a similar beveled gear 60 which rotates on the shaft 61 and is fixedly attached to pulley 64. The shaft 61 is supported by the bracket 62 and also in the member 63 which is also provided with a suitable bearing for the shaft 54. The pulley 64 is fixedly attached to the bevel gear 60 and it is provided with bearings so that it is rotatable on the shaft 61. The pulleys 58 and 64 are disposed at an angle with respect to each other so that the belts driven thereby define a V-shaped trough therebetween. Pulley 58 is employed for driving the conveyor belt 12a and pulley 64 is employed for driving conveyor belt 12b of the conveyor 12. A similar arrangement is employed for driving the two belts of conveyor 11, of which conveyor belt 11a is partially shown in FIG. 3, and one of the shafts 53 of this drive arrangement is provided with the pulley 51, also shown in FIG. 3. The pulley 51 is substantially larger than the pulley 52, and both of these pulleys are driven simultaneously by the belt 50. As a result, the conveyor 11 is driven at a substantially slower speed than the conveyor 12.

The belts 11a, 11b of conveyor 11 and 12a and 12b of conveyor 12 are driven from adjacent ends by means of the pulley and bevel gear arrangement shown in FIGS. 3 and 4 and described above. The other ends of these belts are supported by idler pulleys such as the idler pulley 70 shown in FIG. 3. Pulley 70 is supported by the bracket 71 on plunger 72 which is slidably positioned in the end portion of pipe 31 and is spring biased by spring 73 that is positioned in the pipe 31 between the plunger 72 and the baffle 73. Arrangements such as these hold the belts of the conveyors under tension to facilitate driving thereof.

Elongated bars 75, 76, 77 and 78 are provided as shown in FIGS. 5 and 6 for supporting the conveyor belts. These bars are supported on the brackets 35 to which they are attached by suitable bolts. Bars 75 and 76 extend inside of belt 12b and bars 77 and 78 extend inside of belt 12a between the supporting pulleys thereof. Similar bars are provided inside of belts 11a and 11b for supporting these belts.

As previously described, the belts of conveyors 11, 12 and 13 may all be at substantially the same level. However they may be disposed at different levels as shown in FIG. 7 if desired.

While I have shown a preferred embodiment of the invention, it will be understood that the invention is capable of variation and modification from the form shown so that its scope should be limited only by the scope of the claim appended hereto.

What I claim is:

In apparatus for feeding and spacing of vegetable or similar articles of irregular shape the combination of means for receiving a quantity of irregular articles, said receiving means having means for arranging said articles into parallel rows and for discharging said articles one row at time, a frame comprising a first pair of elongated members positioned in substantially parallel spaced relation, a plurality of spaced brackets extending between said elongated members and attached thereto, a second pair of elongated members, said brackets having upstanding members attached thereto, means for attaching said second elongated members to said upstanding members for supporting said second elongated members above and substantially parallel to said first mentioned elongated members, a first conveyor positioned for receiving the rows of articles discharged from said second mentioned means, a second conveyor for receiving the articles from said first conveyor, means for supporting said first and said second conveyors between said first pair and said second pair of elongated members, common means for driving said conveyors, said driving means including means for driving said second conveyor at a greater speed than said first conveyor, each of said conveyors comprising a pair of belts arranged to form a trough therebetween, the angle of the troughs formed being such that said belts grip opposite sides of said irregular articles to accelerate the articles received by the respective conveyor to the speed of said conveyor, each of the belts of each of said conveyors having a pair of spaced pulleys for support thereof, each of said pulleys having a shaft, means attached to one of said brackets for supporting the shafts of the adjacent ones of said pulleys of both conveyors thereon, said common driving means including means for coupling the shafts of said adjacent pulleys thereto, and an idler belt extending from the output end part of the first conveyor over the input end part of the second conveyor, said idler belt being supported so that it is set into motion by contact with said second conveyor so that the articles pass under it when they go from the lower speed first conveyor to the higher speed second conveyor.

References Cited by the Examiner

UNITED STATES PATENTS

| | | | |
|---|---|---|---|
| 452,191 | 5/91 | Oliver | 198—208 |
| 1,674,419 | 6/28 | Titus | 198—165 |
| 1,865,086 | 6/32 | Cutler | 198—29 |
| 1,972,489 | 9/34 | Rideout | 198—34 X |
| 2,961,979 | 11/60 | Stanley | 198—165 X |

FOREIGN PATENTS 344,205  11/21  Germany.

OTHER REFERENCES

German printed application to Kuhn, DAS 1,041,873, Oct. 23, 1958.

SAMUEL F. COLEMAN, *Primary Examiner.*

EDWARD A. SROKA, ABRAHAM BERLIN, ERNEST A. FALLER, JR., *Examiners.*